Aug. 8, 1939.  B. C. HASKIN  2,169,045
COMPOSITE PHOTOGRAPHY
Filed Nov. 23, 1936

INVENTOR
BYRON C. HASKIN
BY W. E. Beatty
ATTORNEY

Patented Aug. 8, 1939

2,169,045

UNITED STATES PATENT OFFICE 2,169,045

COMPOSITE PHOTOGRAPHY

Byron C. Haskin, Beverly Hills, Calif., assignor to Warner Bros. Pictures, Inc., New York, N. Y., a corporation of Delaware Application November 23, 1936, Serial No. 112,193

5 Claims. (Cl. 88—16)

This invention relates to composite photography and has for an object to lend life and reality to a motion picture of a set or scene. This is accomplished by casting on the set or scene, when it is being photographed, a motion picture of the action in silhouette to simulate shadows of moving actors or objects. The projection distance is so chosen that the shadows thus represented have a size appropriate to the scale of the set, whether full size or miniature. The shadows of the action as thus produced in scale with and on the set, are thereby composited with the set and lend life and reality to the composite scene which may be photographed with a motion picture camera.

The invention contemplates, first, obtaining a motion picture film in silhouette of moving actors and/or other objects with the background portions of the film clear and transparent, and thence projecting a beam of light through the film, as it is intermittently moved in the usual manner, and onto a set or scene while photographing on a sensitized motion picture film the set and the moving projected shadows of the actors in the same scale as the set. It will be seen that by properly positioning and focusing the film upon the set, the size of the shadows may be made as small or as large as desired, thus permitting the projection of such shadows upon miniature sets with the size of the shadow to the same scale as the miniature sets to simulate a full sized set with full sized shadows of actors cast thereon.

A feature of the invention resides in the fact that the shadow of an actor apparently standing near a photographing camera may be cast upon a set or scene being photographed by the camera without photographing either the actor himself or the shadow of the camera.

More particularly describing the invention reference is made to the accompanying drawing wherein.

As the first step in my improved method of photographing shadows, I obtain a motion picture film 10 (Fig. 3), showing kinematographic phases of movement of actors, objects, etc. as at 11 and 12 to be ultimately cast as shadows on the set being photographed. The manner in which such a film may be obtained is considered well known in the art and thus it is believed not necessary to illustrate such procedure herein. For example, a translucent screen (not shown) may be employed, having a single source of light projected on one surface thereof with the photographing camera facing the opposite surface. The actors, etc., are caused to move along the screen between the light source and the adjacent surface of the screen to throw their shadows in silhouette upon the screen. The opposite surface of the screen is photographed and a print of the film thus obtained, as at 10, shows the various actors in silhouette at 11 and 12 with the background portions 13 of the film clear and transparent.

Figure 1:
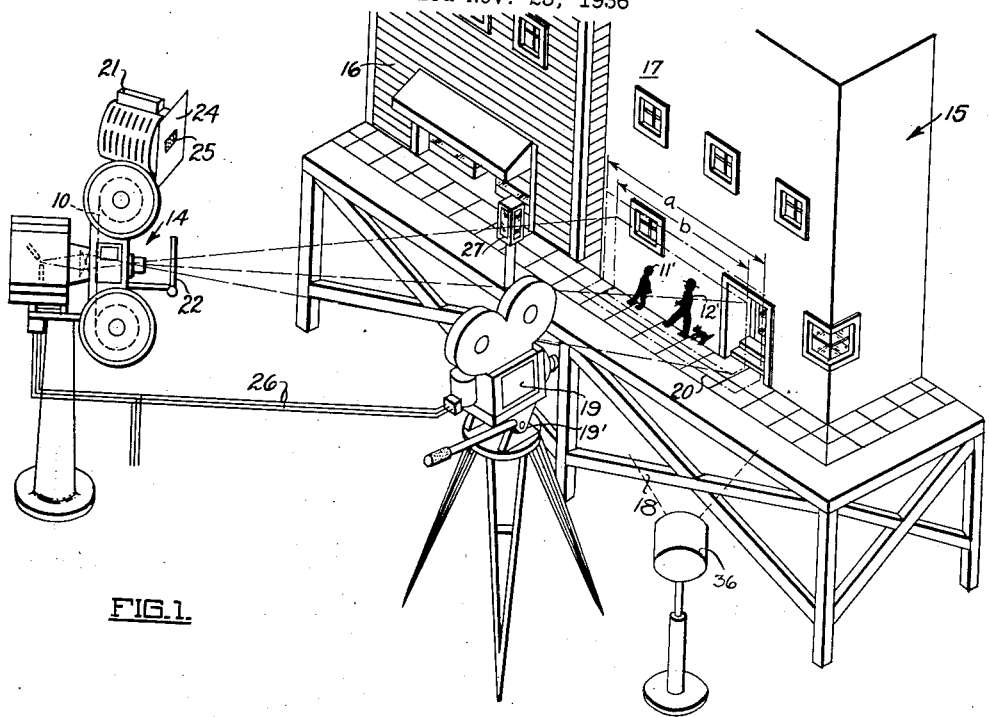
Fig. 1 is a perspective view of an arrangement for preparing a composite photograph of shadows of moving actors and a miniature set or scene according to the present invention.

Referring now to Fig. 1 a miniature set 15 comprising a pair of miniature buildings 16 and 17 suitably supported by a structure 18 is provided in front of a motion picture projector 14 and a motion picture camera 19. Camera 19 is preferably mounted upon a free head 19' to permit universal rotation thereof. Film 10 is placed in projector 14 in the usual manner and the projector is so positioned in relation to the set 15 that shadows 11' and 12' of silhouettes 11 and 12 on the film 10 will be projected in proper relation to the configuration of the set and of a size having the same scale as the set 15. That is, the silhouettes 11 and 12 represent actors walking upon a surface or floor, therefore the shadows 11' and 12' are so positioned in relation to the set 15 as to indicate the actors walking upon a surface such as a walk 20 in front of buildings 16 and 17.

Suitable means is provided such as a three phase interlock system, diagrammatically indicated by wires 26, between the respective operating motors of the projector 14 and camera 19 to maintain the respective pull down mechanisms of the projector and camera in synchronism.

Since the size of the projected shadows 11' and 12' is relatively small in comparison with the size of the original actors photographed on the silhouette film, or in other words, since the ratio between the size of the silhouettes 11, 12 on film 10 and the size of the projected shadows or images 11' 12' is smaller than that in common projection practice, the projector is set relatively close to the front of the set 15. Thus the area of illumination of the set 15 due to the projector is defined by the dimension a which is smaller than the set as a whole.

When it is desired to photograph the whole set or, at least, more than that portion which is illuminated by the projector 14, for example, when making a "vertical pan" shot from the street level of set 15 to the top story thereof, it is necessary to illuminate the rest of the set with light coming from a separate source while preventing a sharp drop or line of demarcation of illumination between the area illuminated by the projector and the area illuminated by such separate source. Further, it is necessary that most of the light which is used to illuminate the portion of the set whereon the shadows 11' and 12' are to appear, be projected by the projector 14, since a large amount of light from a separate source would obliterate the shadows thus projected.

Figures 2, 3:
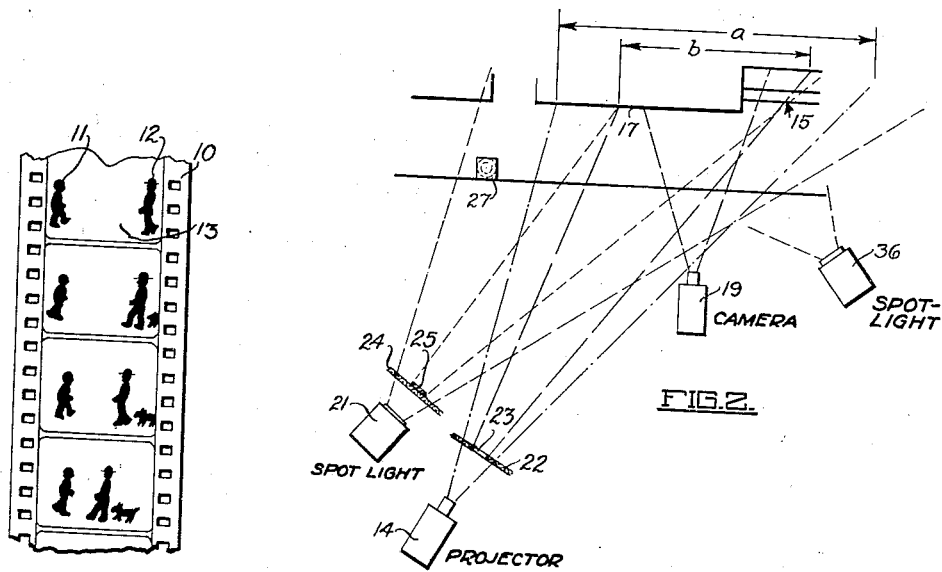
Fig. 2 is a diagrammatic plan view of the arrangement shown in Fig. 1.
Fig. 3 is a fragmentary view of a portion of a motion picture film containing the silhouette of moving actors and will be hereinafter referred to as a silhouette film.

For the purpose just explained I employ one or more additional spotlights as indicated at 21, the area of illumination of such light being contiguous with the area of illumination of projector 14. Referring to Fig. 2, I employ in front of the projector 14 a translucent screen 22 preferably composed of silk or similar material to diffuse or lower the intensity of the light passing therethrough. An opening 23 is provided in the screen to permit a total amount of illumination in the area defined by dimension b on set 15 to be obtained from projector 14. It is through this opening 23 that the shadows of the silhouettes 11 and 12 on film 10 are projected. The adjacent area or zone between the limits of the dimensions a and b, although also illuminated by projector 14 will be seen to receive a lesser degree of illumination due to the passage of the light through the diffusing portion of screen 22. Spotlight 21 also has in front thereof a translucent screen 24 provided to diffuse the light projected thereby. An opaque screen 25 is provided in front of screen 24 to prevent any light from the spotlight 21 from reaching the area b of the minature set 15. However, the partly illuminated zone about the area b as well as the rest of the set 15 receives the diffused light passing through screen 24. Thus it will be seen that a shaded effect will be produced between the highly illuminated area b and the rest of the set 15 which is preferably illuminated at less intensity by light 21.

The translucent screen 24 in front of spotlight 21 may, if desired, be so constructed that only the portion of the light being projected upon the set 15 in the zone indicated between the limits of dimensions a and b (Fig. 2) will be diffused or decreased in intensity. In this case the portions of the light from spotlight 21 which are projected on set 15 outside of the area a would be of total intensity similar to that projected upon the area b by projector 14. Also the total amount of illumination of the zone between the limits of dimensions a and b resulting from the diffused illumination from both light 21 and projector 14 would be equal to the illumination within area b or outside of area a.

One or more flood lights such as 36 may be employed to provide a soft illumination of the whole photographic field, and particularly to soften the shadows 11' and 12' to a natural gray color and to bring added relief as required into the component parts of the miniature 15.

With the particular arrangement shown in Fig. 2 the projection of the shadows 11' and 12', Fig. 1) may be cast upon the front surface of set 15 by means of light which apparently is cast from a light source directly in line with the camera 19, which in reality is in the projector 14, out of line with camera 19. Thus the shadow may be photographed without photographing either the actor himself or the shadow of the camera.

To make such a scene even more natural, in case of a night scene, a miniature street lamp 27 may be provided (Fig. 1), the position of lamp 27 being near the area of illumination a, however, sufficiently clear, to prevent a shadow thereof from being cast on the front surface of set 15. After the sequence of photographing shadows 11' and 12', the camera 19 may then be both panned and tilted counter-clockwise and upwardly, respectively to photograph the image of lamp 27, which appears in the photograph to have been the source of illumination of the zone a.

I claim:

1. Motion picture apparatus comprising the combination of a background, means for projecting on said background motion picture images from film having an action component in silhouette surrounded by a clear field, a mask for said means and having a central portion which transmits light to a high degree and a border portion which transmits light to a lesser degree, the central portion of said mask transmitting the projected images of said silhouette and thereby illuminating to a high degree a certain area of said background surrounding said silhouette, while an adjoining area of said background is illuminated to a lower degree due to said border portion, a light source having a zone of illumination embracing said certain area and said adjoining area of said background, and a mask for said zone having high light impedance in the portion thereof overlying said certain area and lesser light impedance in the portion of said zone overlying said adjoining area of said background, the amount of light impedance in the central and border zones of both of said masks being such that said background is illuminated with substantially the same intensity in said certain area and in said adjoining area.

2. The method of composite photography which comprises projecting a motion picture image beam of light and a separate beam of illumination toward the same area of a background set, the central zone of said motion picture beam containing the image forming light rays, the central zone of one of said beams extending over substantially the same area of said background as the central zone of the other of said beams, light impeding the central zone of said beam of illumination and the border zone of both of said beams by amounts such that said background is illuminated with substantially the same intensity of illumination in said central zone thereof and in said border zone thereof and photographing said background set where thus illuminated by said central zones and said border zones.

3. The method according to claim 2 wherein said background set comprises a miniature and which comprises employing said motion picture image beam of light to project a silhouette picture on said background set, and adjusting the size of said silhouette image to the scale of said background set.

4. The method of composite photography with a motion picture camera which comprises projecting a motion picture of action in silhouette upon a certain area of the front of a set to simulate a shadow cast by said action, the size of said silhouette being appropriate to the size of said set, arranging adjacent said area of said set an object which is an apparent but not a real source of light producing said silhouette upon said set, illuminating said object without casting a shadow thereof in said area, photographing on a series of frames said silhouette moving picture projected on said set, moving the camera to bring said object within the field of view thereof, and photographing said object on a succeeding series of frames.

5. The method according to claim 4 which comprises arranging said silhouette, said set and said object in miniature and in scale with each other.

BYRON C. HASKIN.